(12) United States Patent
Tseng et al.

(10) Patent No.: US 11,333,913 B2
(45) Date of Patent: May 17, 2022

(54) LIQUID CRYSTAL DEVICE

(71) Applicant: InnoLux Corporation, Miao-Li County (TW)

(72) Inventors: Yu-Chih Tseng, Miao-Li County (TW); Kuo-Shun Tsai, Miao-Li County (TW); Chuan-Ming Yeh, Miao-Li County (TW); Chu-Hong Lai, Miao-Li County (TW); Ker-Yih Kao, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/882,774

(22) Filed: May 26, 2020

(65) Prior Publication Data

US 2020/0400994 A1    Dec. 24, 2020

(30) Foreign Application Priority Data

Jun. 21, 2019   (CN) .......................... 201910543551.5

(51) Int. Cl.
*G02F 1/1333*    (2006.01)
*G02F 1/1368*    (2006.01)

(52) U.S. Cl.
CPC ...... *G02F 1/133305* (2013.01); *G02F 1/1368* (2013.01)

(58) Field of Classification Search
CPC .......................... G02F 1/133305; G02F 1/1368
See application file for complete search history.

(56) References Cited

U.S. PATENT DOCUMENTS

| | | | | |
|---|---|---|---|---|
| 2003/0077886 A1* | 4/2003 | Machida | ............... | H01L 21/223 438/535 |
| 2007/0085090 A1* | 4/2007 | Kim | ....................... | H01L 27/12 257/83 |
| 2009/0141225 A1* | 6/2009 | Park | ...................... | G02F 1/1335 349/122 |
| 2013/0120314 A1* | 5/2013 | Ishibashi | ............. | G02F 1/13338 345/174 |
| 2017/0293065 A1* | 10/2017 | Kim | .................. | G02F 1/133308 |
| 2018/0233545 A1 | 8/2018 | Hsieh | | |
| 2018/0364521 A1* | 12/2018 | Baek | .................... | G02B 5/3058 |
| 2020/0301185 A1* | 9/2020 | Huang | .............. | G02F 1/133305 |

* cited by examiner

*Primary Examiner* — Dung T Nguyen
(74) *Attorney, Agent, or Firm* — Winston Hsu

(57) ABSTRACT

A liquid crystal device comprises a first polymer substrate, a first buffer layer, thin film transistors, a liquid crystal layer and a second polymer substrate. The first buffer layer is disposed on the first polymer substrate. The thin film transistors are disposed on the first buffer layer. The liquid crystal layer is disposed on the thin film transistors. The second polymer substrate is disposed on the liquid crystal layer.

20 Claims, 6 Drawing Sheets

LIQUID CRYSTAL DEVICE

CROSS REFERENCE TO RELATED APPLICATION

This application claims priority to Chinese Patent Application No. 201910543551.5, filed on Jun. 21, 2019. The contents thereof are included herein by reference.

BACKGROUND OF THE DISCLOSURE

1. Field of the Disclosure

The present disclosure relates to a liquid crystal device, and more particularly, to a flexible liquid crystal device.

2. Description of the Prior Art

A flexible electronic equipment is a new technology for making electronic components and devices on a foldable (or similar to bendable, stretchable, flexible) substrate. Compared with a rigid electronic device, a flexible electronic device provides many advantages, including small size, cost-effectiveness, lightness, durability, flexibility and portability. Due to the potential utility of this technology for use in electronic applications, including flexible displays, flexible touch panels, wearable electronic devices . . . etc., this technology has become increasingly popular.

Due to this technology's increasing popularity, research and development on flexible liquid crystal display device technology has been extensively done. However, even so, there are still many drawbacks to be overcome.

SUMMARY OF THE DISCLOSURE

In view of this, it is necessary to propose an improved flexible liquid crystal device to solve the problems which the current flexible liquid crystal display devices encounter. For example, in a flexible liquid crystal display device with a flexible substrate, the distortion of the glass carrier may have adverse influence on the subsequent processes after the polymer substrate is coated and baked because the stress of the polymer substrate and that of the glass carrier is not the same.

According to an embodiment of the present disclosure, a liquid crystal device is proposed. The liquid crystal device includes a first polymer substrate, a first buffer layer, a plurality of thin film transistors, a liquid crystal layer, and a second polymer substrate. The first buffer layer is disposed on the first polymer substrate. The material of the first buffer layer is selected from a group consisting of silicon nitride, silicon oxide, and silicon oxynitride. The thin film transistors are disposed on the first buffer layer. The liquid crystal layer is disposed on the thin film transistors. The second polymer substrate is disposed on the liquid crystal layer.

According to the flexible liquid crystal device of the embodiments of the present disclosure, the lower glass carrier may become flatter to facilitate subsequent processes since an additional inorganic buffer layer is used as a stress layer atop the organic polymer substrate. Or the inorganic buffer layer may be used to reduce the entry of moist to achieve the improvement the flexible liquid crystal device.

DETAILED DESCRIPTION

The present disclosure may be understood by reference to the following detailed description, taken in conjunction with the drawings as described below. For purposes of illustrative clarity understood, various drawings of this disclosure show a portion of the electronic device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to".

When an element or layer is referred to as being "on" or "connected to" another element or layer, it may be directly on or directly connected to the other element or layer, or intervening elements or layers may be presented. In contrast, when an element is referred to as being "directly on" or "directly connected to" another element or layer, there are no intervening elements or layers presented.

The terms "about", "substantially", "equal", Or "$_{same}$" generally mean within 20% of a given value or range, or mean within 10%, 5%, 3%, 2%, 1%, or 0.5% of a given value or range.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

The technical features in different embodiments described in the following may be replaced, recombined, or mixed with one another to constitute another embodiment without departing from the spirit of the present disclosure.

Figure 1:
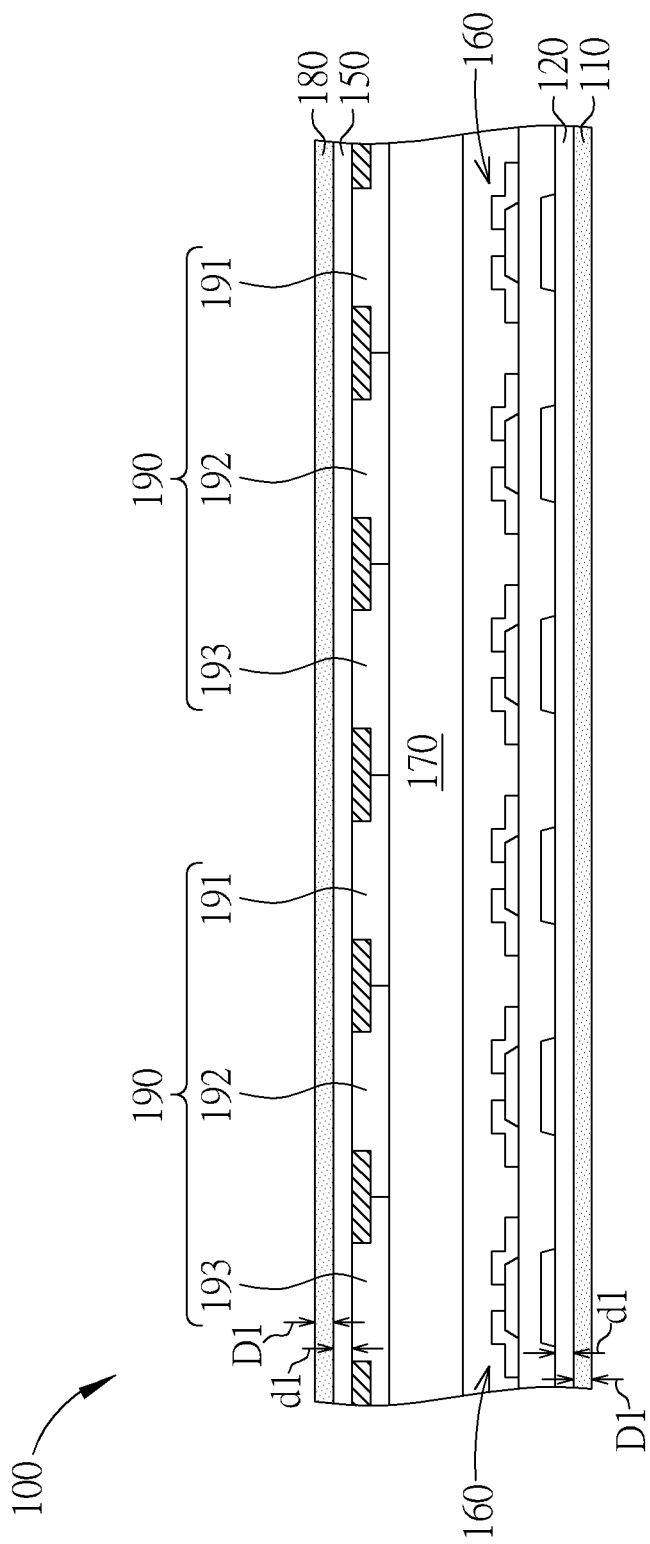
FIG. 1 is a schematic cross-sectional view of a flexible liquid crystal device according to a first embodiment of the present disclosure.
Figure 2:
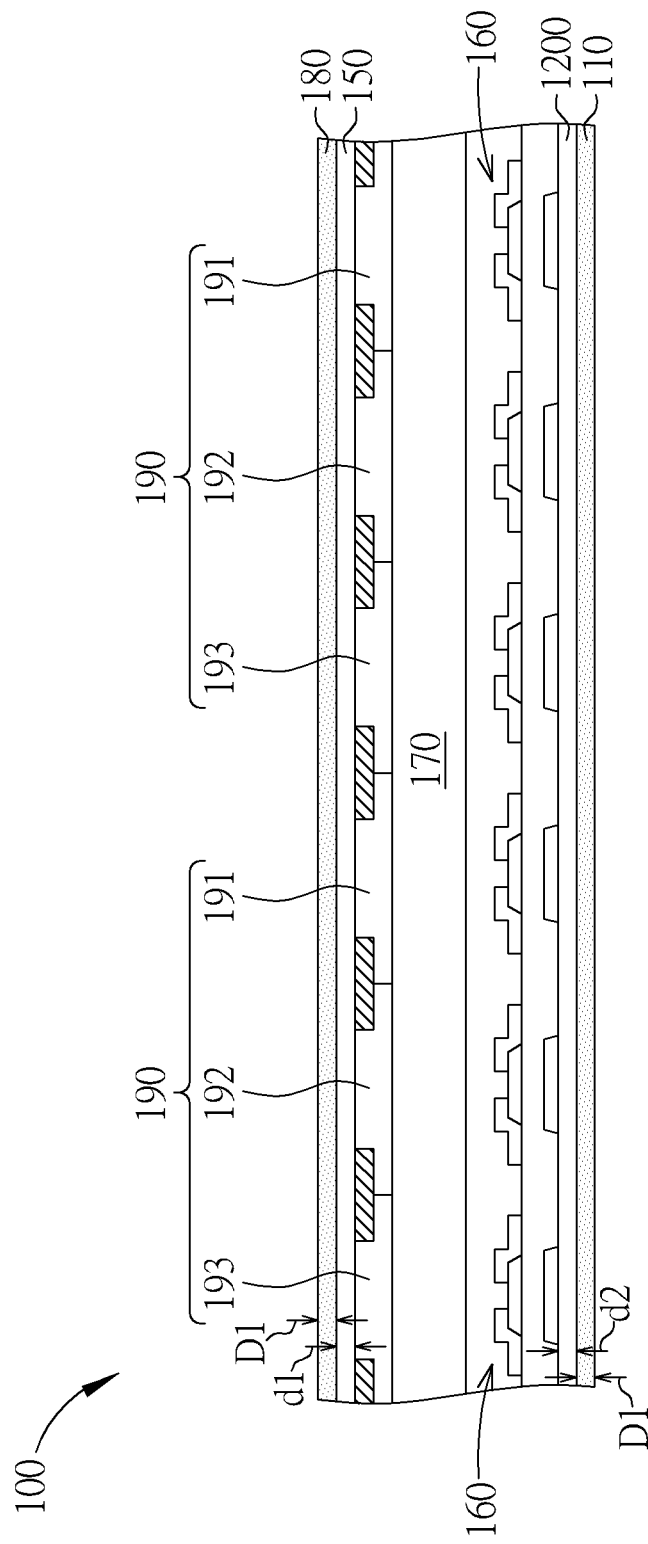
FIG. 2 is a schematic cross-sectional view of a flexible liquid crystal device according to a second embodiment of the present disclosure.

Please refer to FIG. 1 and FIG. 2. FIG. 1 is a schematic cross-sectional view of a flexible liquid crystal device 100 according to a first embodiment of the present disclosure, and FIG. 2 is a schematic cross-sectional view of a flexible liquid crystal device 100 according to a second embodiment of the present disclosure. The flexible liquid crystal device 100 may include a first polymer substrate 110, a first buffer layer 120, a plurality of thin film transistors 160, a liquid crystal layer 170, and a second polymer substrate 180. The first buffer layer 120 is directly disposed on the first polymer substrate 110. The plurality of thin film transistors 160 are disposed on the first buffer layer 120, that is, on the side of the first buffer layer 120 away from the first polymer substrate 110.

The first polymer substrate 110 and the second polymer substrate 180 may be an organic polymer material, and may be formed in the steps of baking after coating. The water absorption of the first polymer substrate 110 and of the second polymer substrate 180 is generally higher than that of a buffer layer. The first polymer substrate 110 and the second polymer substrate 180 may be made of a polyimide-based resin material, for example, a porous transparent polyimide polymer material.

The first buffer layer 120 may be made of an inorganic silicon-containing material having a water absorption rate lower than that of the first polymer substrate 110 and the second polymer substrate 180, for example, selected from a group consisting of silicon nitride, silicon oxide, and silicon oxynitride. In one aspect, in the first embodiment of the present disclosure as illustrated in FIG. 1, the material of the first buffer layer 120 may be a silicon nitride material. In the first embodiment of the present disclosure as illustrated in FIG. 1, the thickness d1 of the first buffer layer 120 may be determined by the thickness D1 of the first polymer substrate 110 disposed directly below it, and the thickness ratio (d1/D1) of the thickness d1 of the first buffer layer 120 to the thickness D1 of the first polymer substrate 110 may be greater than 0.001 and less than or equal to (i.e. not greater than) 0.9 [i.e., $0.001 < (d1/D1) \leq 0.9$]. For example, the thickness D1 of the first polymer substrate 110 may be greater than or equal to (i.e. not less than) 5 µm (micrometers) and less than or equal to 45 µm, or may be greater than or equal to 6 µm and less than or equal to 20 µm. The silicon nitride material in the first buffer layer 120 may be used as a stress layer to make the glass carrier flatter after baking to facilitate subsequent processes.

In the second embodiment of the present disclosure as illustrated in FIG. 2, the material of the first buffer layer 1200 may be a silicon oxide material. The thickness d1 of the first buffer layer 1200 may be determined by the thickness D1 of the first polymer substrate 110 disposed directly below it. The thickness ratio (d2/D1) of the thickness d2 of the first buffer layer 1200 to the thickness of the first polymer substrate 110 may be greater than 0.005 and less than or equal to 0.9 [i.e., $0.005 < (d2/D1) \leq 0.9$]. For example, the thickness D1 of the first polymer substrate may be greater than or equal to 5 µm and less than or equal to 45 µm, or may be greater than or equal to 6 µm and less than or equal to 20 µm. The silicon oxide material in the first buffer layer 1200 may be used as a stress layer to make the glass carrier flatter after baking to facilitate subsequent processes.

The thin film transistor 160 includes a gate electrode provided at the bottom, a gate dielectric layer provided on the gate electrode, a source electrode and a drain electrode provided on both sides of the gate electrode, and a semiconductor layer provided between the gate dielectric layer and the source/the drain electrode, but the present disclosure is not limited to this structure of thin film transistor.

The liquid crystal layer 170 is disposed between the first polymer substrate 110 and the second polymer substrate 180, and the direction of the liquid crystal molecules in the liquid crystal layer 170 may be controlled by the thin film transistors 160. The liquid crystal material in the liquid crystal layer 170 may include various suitable materials such as nematic liquid crystal, smectic liquid crystal, and cholesteric liquid crystal, but the present disclosure is not limited thereto.

The second polymer substrate 180 is disposed on the liquid crystal layer 170, and may also be regarded as being disposed on a plurality of thin film transistors 160. The present disclosure may further include a fourth buffer layer 150 directly connected to the surface of the second polymer substrate 180, and the fourth buffer layer 150 is disposed between the liquid crystal layer 170 and the second polymer substrate 180. In some embodiments, a color filter layer 190 may be further provided between the fourth buffer layer 150 and the liquid crystal layer 170, so that the color filter layer 190 is provided to correspond to the thin film transistor 160. The color filter layer 190 may include a plurality of color filter 191, color filter 192, and color filter 193, and the color filters may have different colors.

The fourth buffer layer 150 may be made of an inorganic silicon-containing material having a water absorption rate lower than that of the first polymer substrate 110 and of the second polymer substrate 180, for example, selected from a group consisting of silicon nitride, silicon oxide, and silicon oxynitride. In the first embodiment of the present disclosure as illustrated in FIG. 1, the material of the fourth buffer layer 150 may be a silicon nitride material. In the second embodiment of the present disclosure as illustrated in FIG. 2, the material of the fourth buffer layer 150 may be a silicon oxide material.

In the first embodiment of the present disclosure as illustrated in FIG. 1, or the second embodiment of the present disclosure as illustrated in FIG. 2, the thicknesses of the first polymer substrate 110 and the thicknesses of the second polymer substrate 180 may be the same or different. In addition, in the first embodiment of the present disclosure illustrated in FIG. 1 or in the second embodiment of the present disclosure illustrated in FIG. 2, the material of the first buffer layer 120 and the material of the fourth buffer layer 150 may also be the same or different. In addition, the thickness of the first buffer layer 120 and the thickness of the fourth buffer layer 150 may be the same or different.

Figure 3:
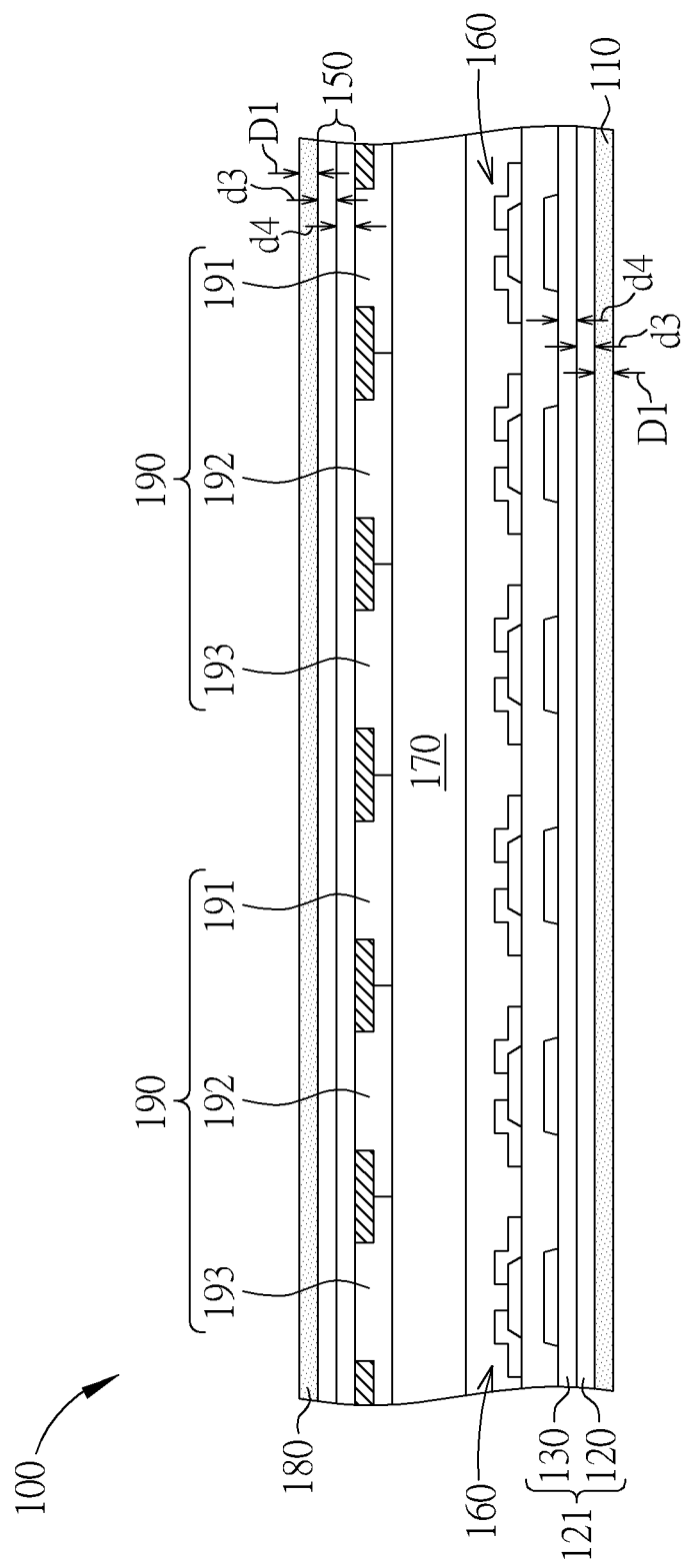
FIG. 3 is a schematic cross-sectional view of a flexible liquid crystal device according to a third embodiment of the present disclosure.
Figure 4:
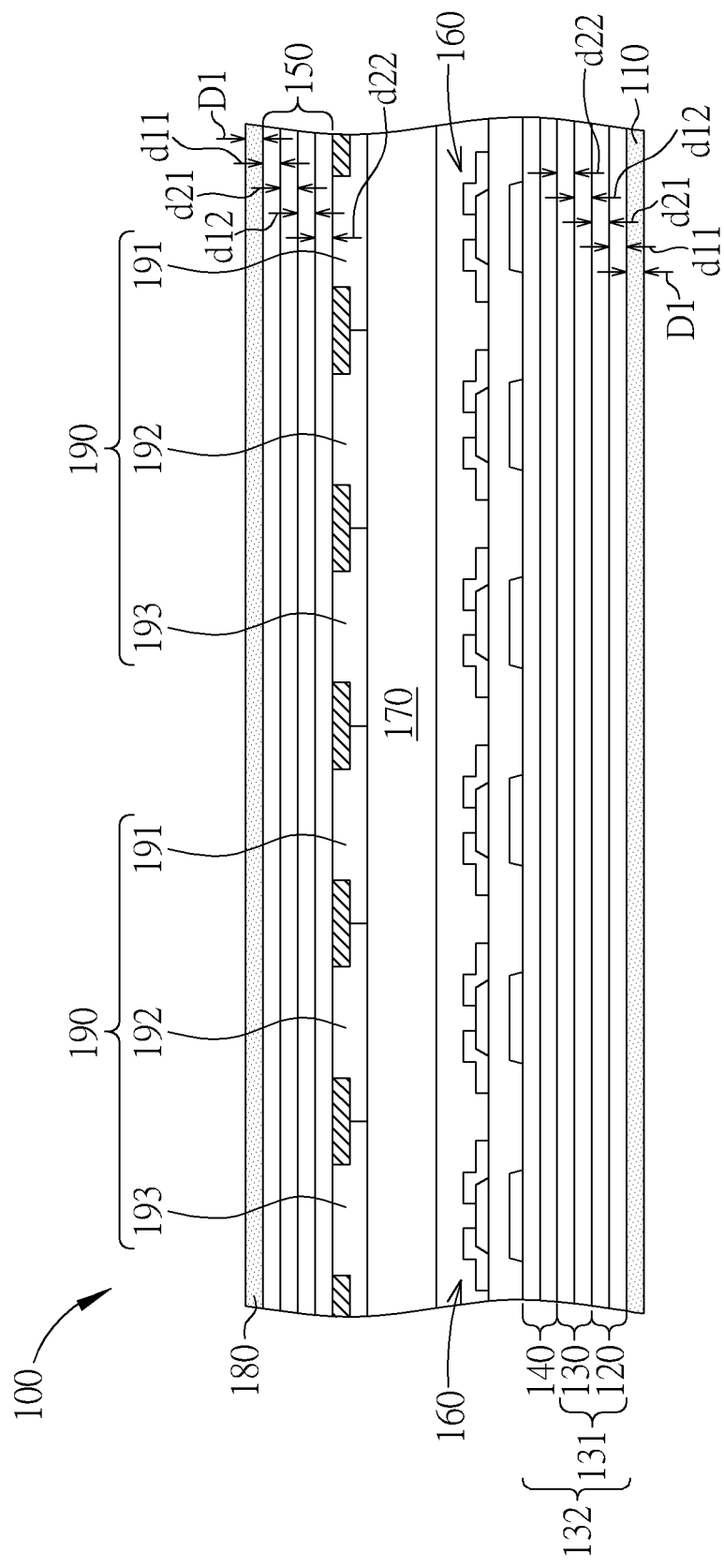
FIG. 4 is a schematic cross-sectional view of a flexible liquid crystal device according to a fourth embodiment of the present disclosure.

The buffer layer of the flexible liquid crystal device 100 of the third embodiment and of the fourth embodiment of the present disclosure may be a composite layer including different materials or a stack layer including different materials. Please refer to FIG. 3 and FIG. 4 respectively. FIG. 3 is a schematic cross-sectional view of a flexible liquid crystal device 100 according to a third embodiment of the present disclosure, and FIG. 4 is a schematic cross-sectional view of a flexible liquid crystal device 100 according to a fourth embodiment of the present disclosure.

In the third embodiment of the present disclosure, the first buffer layer 120 and the second buffer layer 130 may be made of an inorganic silicon-containing material having a water absorption rate lower than that of the first polymer substrate 110 and of the second polymer substrate 180, for example, selected from a group consisting of silicon nitride, silicon oxide, and silicon oxynitride. For example, the material of the first buffer layer 120 may be a silicon nitride material, and the material of the second buffer layer 130 maybe a silicon oxide material. The material of the first buffer layer 120 and the material of the second buffer layer 130 may be the same or different, and the thickness of the first buffer layer 120 and the thickness of the second buffer layer 130 may be the same or different. In some embodiments, the silicon nitride layer in the buffer layer may be in direct contact with the first polymer substrate 110 or with the second polymer substrate 180.

In the third embodiment of the present disclosure as illustrated in FIG. 3, the total thickness (d3+d4) of the composite layer 121 formed by the thickness d3 of the first buffer layer 120 and by the thickness d4 of the second buffer layer 130 may be determined by the thickness D1 of the first polymer substrate 110, and the thickness ratio [(d3+d4)/D1] of the total thickness (d3+d4) of the composite layer 121 of the first buffer layer 120 and of the second buffer layer 130 to the thickness D1 of the first polymer substrate 110 may be greater than 0.001 and less than or equal to 1 [i.e., 0.001< (d3+d4)/D1≤1]. For example, the thickness D1 of the first polymer substrate 110 may be greater than or equal to 5 µm and less than or equal to 45 µm, or may be greater than or equal to 6 µm and less than or equal to 20 µm.

The thickness d3 of the first buffer layer 120 may be greater than the thickness d4 of the second buffer layer 130. In other words, the thickness of the silicon nitride material may be greater than the thickness of the silicon oxide material. In such a way, a better moisture blocking effect or larger correcting stress may be possible. The thickness d3 of the first buffer layer 120 may also be smaller than the thickness d4 of the second buffer layer 130, or the thickness of the silicon nitride material may be smaller than the thickness of the silicon oxide material. In such a way, it is easier to compensate the brittleness of the silicon nitrogen material with the silicon oxide material to reduce the chance of brittleness of the silicon nitride material.

The first buffer layer 120 and the second buffer layer 130 in the composite layer 121 may be used together to serve as a stress layer, so that the glass carrier is relatively flat after baking to facilitate subsequent processes. The silicon nitride layer in direct contact with the polymer substrate facilitates matching between material properties or enhancing moisture blocking effect. The silicon oxide layer in direct contact with the metal material facilitates the matching of the material properties. In one embodiment of the present disclosure, there may be a plurality of buffer layers between the first polymer substrate 110 and the second polymer substrate 180, for example, a composite layer 121 composed of the first buffer layer 120 and of the second buffer layer 130, and a single buffer layer or a composite layer may be disposed on the second polymer substrate 180. The second buffer layer 130 may be disposed between the first buffer layer 120 and a plurality of thin film transistors 160.

In the fourth embodiment of the present disclosure, the first buffer layer 120 and the second buffer layer 130 may be made of an inorganic silicon-containing material having a water absorption rate lower than that of the first polymer substrate 110 and the second polymer substrate 180, for example, selected from a group consisting of silicon nitride, silicon oxide, and silicon oxynitride. The materials of the first buffer layer 120 and the materials of the second buffer layer 130 may be the same or different. For example, the material of the first buffer layer 120 may be a composite layer of a silicon nitride material and a silicon oxide material, and the material of the second buffer layer 130 may also be a composite layer of a silicon nitride material and a silicon oxide material, altogether to form a stack layer 131. Or alternatively, if necessary, a third buffer layer 140 selected from a group consisting of silicon oxynitride, silicon nitride, or silicon oxide, may join together to form a stack layer 132.

In such a way, the inorganic layers originally in the form of single layer, became a multi-layer structure after stacked together. For example, they may be silicon nitride, silicon oxide, silicon nitride, silicon oxide . . . and so on to form repeatedly arranged stacked layer structure 131, repeatedly arranged stacked layer structure 132. In the structure of the repeatedly arranged stack layer 131 and stacked layer 132, the more the single inorganic layers are repeatedly arranged, the longer the path of the entry of moist, thereby improving the effect of blocking moist.

In some embodiments, the silicon nitride layer in the stack layer 131 is directly provided on the first polymer substrate 110 or on the second polymer substrate 180, that is, in direct contact with the first polymer substrate 110 or with the second polymer substrate 180.

In the fourth embodiment of the present disclosure as illustrated in FIG. 4, the total thickness of the stack layer 131 formed by the thickness of the first buffer layer 120 and the thickness of the second buffer layer 130 may be determined by the thickness D1 of the first polymer substrate 110. Taking the stack layer 131 composed of the first buffer layer 120 and the second buffer layer 130 as an example, the total thickness of the stack layer 131 includes at least the thickness of the silicon nitride layers (d11+d12) and the thickness of the silicon oxide layers (d21+d22). The thickness ratio (d11+d12+d21+d22)/D1 of the total thickness (d11+d12+d21+d22) of the stack layer 131 formed by the first buffer layer 120 and the second buffer layer 130 to the thickness D1 of the first polymer substrate 110 may be greater than 0.001 and less than or equal to 1 [i.e., 0.001<(d11+d12+d21+d22)/ D1≤1]. For example, the thickness D1 of the first polymer substrate 110 may be greater than or equal to 5 µm and less than or equal to 45 µm, or may be greater than or equal to 6 µm and less than or equal to 20 µm. Each buffer layer in the stack layer 131 may be used together to serve as a stress layer, so that the glass carrier is relatively flat after baking to facilitate subsequent processes. When the silicon nitride layer is indirect contact with the polymer substrate, it facilitates matching between material properties or enhancing moisture blocking effect.

In some embodiments, the total thickness of the stack layer 132 formed by the thickness of the first buffer layer 120, by the thickness of the second buffer layer 130 and by the thickness of the third buffer layer 140 may be determined by the thickness D1 of the first polymer substrate 110. For example, the thickness ratio of the total thickness of the stack layer 132 to the thickness of the first polymer substrate 110 may be greater than 0 and less than or equal to 1. In one embodiment of the present disclosure, the second buffer layer 130 may optionally be a polymer film, in other words, the second buffer layer 130 in this embodiment may be regarded as another polymer substrate. In addition, the material of the third buffer layer 140 may be the same as that of the first buffer layer 120, and the third buffer layer 140 is provided between the second buffer layer 130 and a plurality of thin film transistors 160.

In addition, in the fourth embodiment of the present disclosure as illustrated in FIG. 4, the material of the stack layer 131 or the material of the stack layer 132 and the material of the fourth buffer layer 150 may be the same or different. The thickness of the stack layer 131 or the thickness of the stack layer 132 and the thickness of the fourth buffer layer 150 may be the same or different. The stack structure of the stack layer 131 or the stack structure of the stacked layer 132 and the stack structure of the fourth buffer layer 150 may be the same or different. Optionally, there may be a plurality of buffer layers provided between the first polymer substrate 110 and the second polymer substrate 180, and there may be a single buffer layer or a plurality of buffer layers provided on the second polymer substrate 180.

Figure 5:
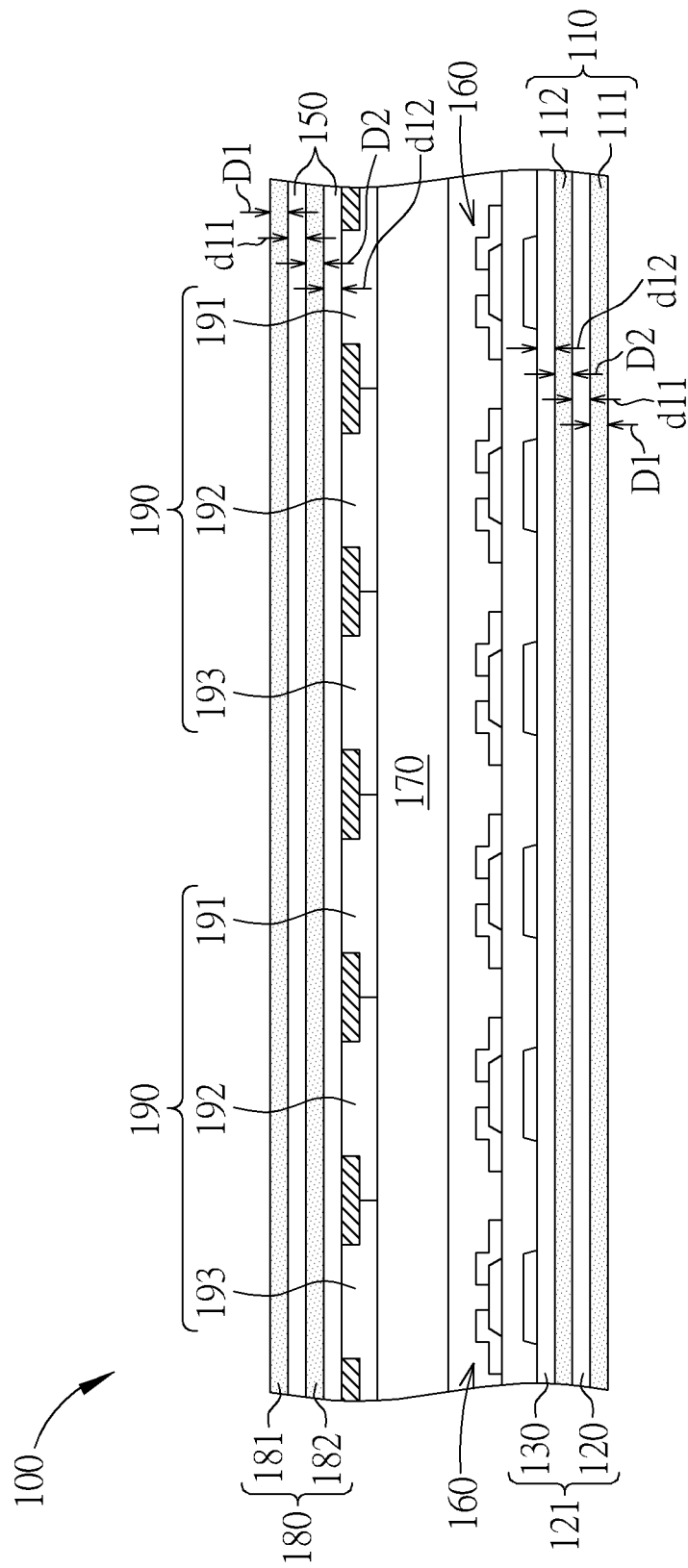
FIG. 5 is a schematic cross-sectional view of a flexible liquid crystal device according to a fifth embodiment of the disclosure.

Please refer to FIG. 5. FIG. 5 is a schematic cross-sectional view of a flexible liquid crystal device 100 according to a fifth embodiment of the disclosure. The flexible liquid crystal device 100 includes a first polymer substrate 110, a composite layer 121, a plurality of thin film transistors 160, a liquid crystal layer 170, and a second polymer substrate 180. In one embodiment, the composite layer 121 includes a first buffer layer 120 and a second buffer layer 130; the first polymer substrate 110 includes a first polymer bottom substrate 111 and a first polymer top substrate 112. The first polymer bottom substrate 111, the first buffer layer 120, the first polymer top substrate 112, and the second buffer layer 130 are sequentially stacked, and a plurality of thin film transistors 160 are disposed on the second buffer layer 130. In the flexible liquid crystal device 100 according to the fifth embodiment of the present disclosure, the polymer substrates that was originally a single layer may be double or multiple layers (in which the thickness of at least one polymer substrate may be, for example, smaller than that of the single polymer layer), and a buffer layer selected from a silicon nitride material, a silicon oxide material, and a silicon oxynitride material is provided between the double-layered or multi-layered polymer substrate. When a thinner polymer substrate is prepared, the drying time after coating may be less to facilitate the reduction of contamination of falling particles due to exposure to the environment.

In the fifth embodiment of the present disclosure, the first buffer layer 120 is in direct contact with the first polymer substrate 110 and is provided between the first polymer bottom substrate 111 and the first polymer top substrate 112.

In the fifth embodiment of the present disclosure as illustrated in FIG. 5, the total thickness (d11+d12) of the composite layer 121 formed by the thickness d11 of the first buffer layer 120 and by the thickness d12 of the second buffer layer 130 may be determined by the total thickness (D1+D2) of the first polymer substrate 110, and the total thickness ratio of the composite layer 121 (d11+d12) of the first buffer layer 120 and of the second buffer layer 130 to the total thickness of the first polymer substrate (D1+D2) may be greater than 0 and less than or equal to 1 [i.e., 0<(d11+d12)/(D1+D2)≤1]. The total thickness (D1+D2) of the first polymer substrate may be greater than or equal to 5 μm and less than or equal to 45 μm, or may be greater than or equal to 6 μm and less than or equal to 20 μm.

The fourth buffer layer 150 in direct contact with the second polymer substrate 180 is provided between the second polymer bottom substrate 181 and the first polymer top substrate 182.

In the embodiments of the present disclosure, the material selection, the thickness, and the stacking structure of the first polymer substrate 110, the composite layer 121, the second polymer substrate 180, and the fourth buffer layer 150 may be the same or different. For example, a composite layer may be used silicon nitride material of the first buffer layer 120 and silicon oxide material of the second buffer layer 130 to cooperate with the first polymer substrate 110, and a composite layer may be used silicon nitride material of the fourth buffer layer 150 to cooperate with the second polymer substrate 180. There may be a plurality of buffer layers provided between the first polymer substrate 110 and the second polymer substrate 180, and there may be a single buffer layer or a plurality of buffer layers provided on the second polymer substrate 180.

Figure 6:
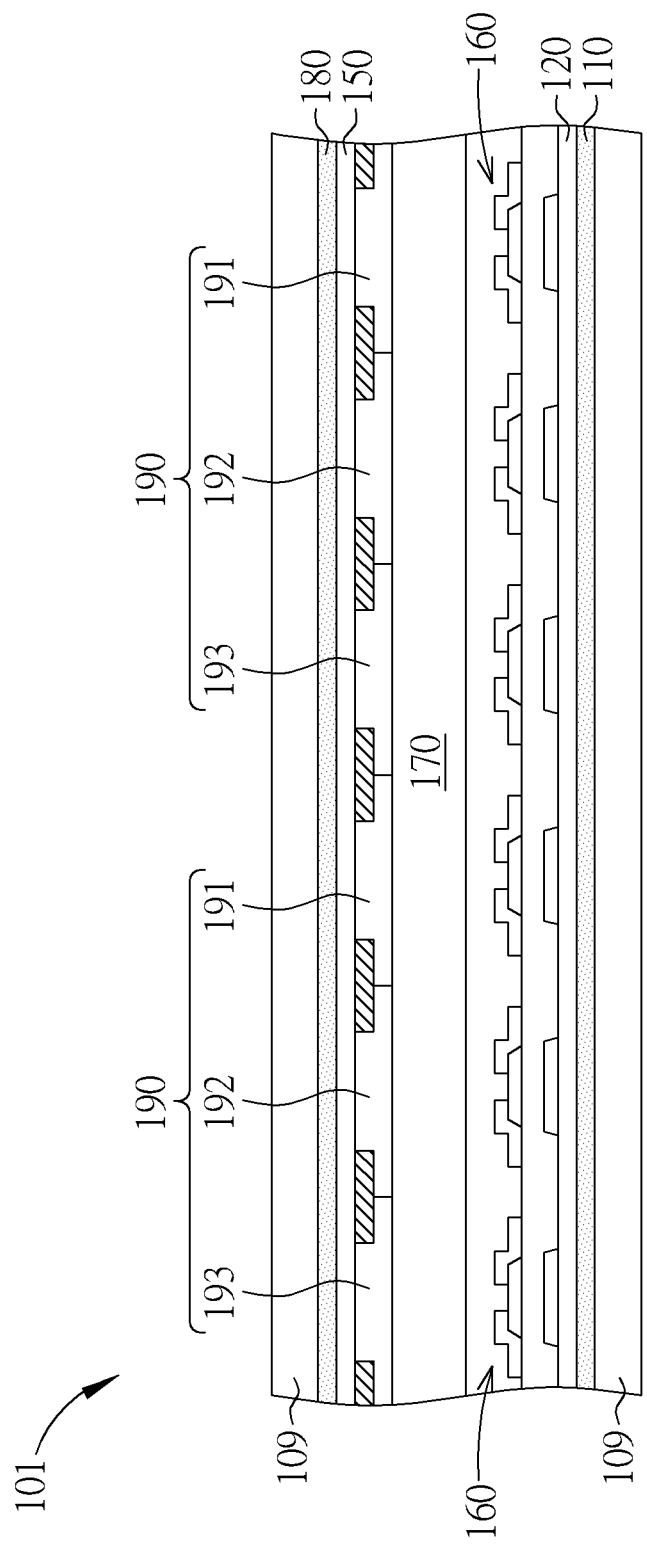
FIG. 6 is a schematic cross-sectional view of an intermediate during a manufacturing process of a flexible liquid crystal device according to a sixth embodiment of the disclosure.

Please refer to FIG. 6. FIG. 6 is a schematic cross-sectional view of an intermediate 101 during a manufacturing process of a flexible liquid crystal device according to a sixth embodiment of the disclosure. In addition to a first polymer substrate 110, a first buffer layer 120, a plurality of thin film transistors 160, a liquid crystal layer 170, and a second polymer substrate 180, the flexible liquid crystal device 100 includes a glass carrier 109 for use as the carrier of the first polymer substrate 110 and the carrier of the second polymer substrate 180.

For example, a first piece including a plurality of thin film transistors 160, a first buffer layer 120, a first polymer substrate 110, and a glass carrier 109, and a second piece including a color filter layer 190, a fourth buffer layer 150, the second polymer substrate 180 and the glass carrier 109 may be respectively formed in advance. Later, the first piece, the second piece and the liquid crystal layer 170 are combined to obtain the intermediate 101 as shown in FIG. 6. Then, through the process of separating the glass carrier 109, for example, with the treatment of the interface between the polymer substrate and the glass carrier 109 by laser to remove the glass carrier 109 in the intermediate 101, the flexible liquid crystal device 100 shown as in FIG. 1 is obtained. The flexible liquid crystal device 100 in each embodiment of the present disclosure may be further assembled with a backlight module (not shown) to obtain a resultant flexible liquid crystal display device.

Therefore, in the above embodiments, the flexible liquid crystal device 100 may further include a backlight module. In addition, each one of the first piece and the second piece may also include components or layers such as switching elements, polarizers, and traces, or may optionally include components or layers such as color filters, polarizers, light-shielding layers, and wiring lines. For the reason of simplicity, they are not shown in the figures.

In addition, in each of the above embodiments, the appearance, such as color (L*a*b*), between the porous transparent polyimide polymer material applicable to the present disclosure and the conventional yellow polyimide polymer material is different. The transmittance of yellow polyimide polymer material is lower than that of porous transparent polyimide polymer material. For example, the color b* value of the porous transparent polyimide polymer material may be less than 10, the color b* value, for example, may be about 1 to 6, and the color b* value of the yellow polyimide polymer material may be about 40 or above so there is a significant difference.

The color b* value is defined by the color space CIE 1976 (L*, a*, b*), that is, CIELAB. CIE L*a*b* is a commonly used color model that may be used to describe all colors visible to the human eye. It was developed by the Commission International d'Eclairage. Three parameters in the model are used: L* refers to the brightness of the color, L*=0 means black, and L*=100 means white; a* describes the position between red purple and green, negative value means green, and positive values represent red-purple; b* describes the position between yellow and blue, negative values represent blue, and positive values represent yellow. Therefore, the color b* value of the porous transparent polyimide polymer material is less than 10, which means that the porous transparent polyimide polymer material is visually barely yellow or is substantially transparent.

Traditionally, in flexible liquid crystal displays, the glass carrier cannot be subjected to subsequent procedures after the polyimide polymer material is coated and baked because the stress of the polyimide polymer material and that of the glass carrier is not the same. Using an additional inorganic layer as a stress layer on the polyimide polymer material facilitates the distorted glass carrier to become flatter for subsequent procedures. Or, the inorganic layer may also have the effect of blocking moist.

In the flexible liquid crystal device 100 of the present disclosure according to the above embodiments, the buffer layer can improve the distortion caused by stress after the polymer substrate is coated and dried on the glass carrier. For example, the vertical distortion height measured from lowermost point of the glass carrier to the edge of the glass carrier may be corrected and reduced to less than 0.01 mm, so the product quality of the flexible substrate liquid crystal device may be effectively improved. In some embodiments, the stress between the buffer layer and the polymer substrate is well matched, or the buffer layer can provide a higher moisture blocking effect to increase the reliability or to improve product quality of the flexible liquid crystal display device.

Regarding the measure of the thickness, it may be done by using an optical microscopy (OM), scanning electron microscope (SEM), an α-step), an ellipse thickness gauge, or other suitable methods. Specifically speaking, in some embodiments, a cross-sectional image of the structure may be obtained by using a scanning electron optical microscope after the liquid crystal layer 170 is removed, and the maximum thickness in the cross-sectional image may be measured. The above-mentioned maximum thickness may be the maximum thickness in any cross-sectional image, in other words, it may be the maximum thickness in a local area of the liquid crystal device.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A liquid crystal device, comprising:
    a first polymer substrate comprising a first polymer bottom substrate and a first polymer top substrate;
    a composite layer comprising a first buffer layer disposed on the first polymer substrate and a second buffer layer, wherein a material of the first buffer layer is selected from a group consisting of silicon nitride, silicon oxide and silicon oxynitride, and the first polymer bottom substrate, the first buffer layer, the first polymer top substrate and the second buffer layer are sequentially stacked;
    a plurality of thin film transistors disposed on the first buffer layer;
    a liquid crystal layer disposed on the plurality of thin film transistors; and
    a second polymer substrate disposed on the liquid crystal layer.

2. The liquid crystal device according to claim 1, wherein a ratio of a thickness of the first buffer layer to a thickness of the first polymer substrate is greater than 0.001 and not greater than 1.

3. The liquid crystal device according to claim 2, wherein the thickness of the first polymer substrate is not less than 5 µm and not greater than 45 µm.

4. The liquid crystal device according to claim 2, wherein the thickness of the first polymer substrate is not less than 6 µm and not greater than 20 µm.

5. The liquid crystal device according to claim 1, wherein the second buffer layer disposed between the first buffer layer and the plurality of thin film transistors, wherein a material of the second buffer layer is selected from a group consisting of silicon nitride, silicon oxide, silicon oxynitride, and a polymer.

6. The liquid crystal device according to claim 5, wherein the material of the first buffer layer is different from the material of the second buffer layer.

7. The liquid crystal device according to claim 5, wherein a ratio of a total thickness of the first buffer layer and of the second buffer layer to a thickness of the first polymer substrate is greater than 0 and not greater than 1.

8. The liquid crystal device according to claim 5, wherein the second buffer layer comprises a polymer film, and a thickness of the polymer film is not less than 6 µm and not greater than 10 µm.

9. The liquid crystal device according to claim 5, further comprising:
    a third buffer layer disposed between the second buffer layer and the plurality of thin film transistors, wherein a material of the third buffer layer is the same as the material of the first buffer layer.

10. The liquid crystal device according to claim 9, wherein a ratio of a total thickness of the first buffer layer, of the second buffer layer and of the third buffer layer to a thickness of the first polymer substrate is greater than 0 and not greater than 1.

11. The liquid crystal device according to claim 9, wherein the first buffer layer, the second buffer layer and the third buffer layer together form a stack layer and a multi-layer structure.

12. The liquid crystal device according to claim 5, wherein the second buffer layer comprises a polymer film.

13. The liquid crystal device according to claim 1, further comprising:
    a fourth buffer layer disposed on the second polymer substrate, and a material of the fourth buffer layer is selected from a group consisting of silicon nitride, silicon oxide and silicon oxynitride.

14. The liquid crystal device according to claim 13, wherein the second polymer substrate is disposed on the plurality of thin film transistors, and a thickness of the second polymer substrate is the same as a thickness of the first polymer substrate.

15. The liquid crystal device according to claim 13, wherein a thickness of the second polymer substrate is different from a thickness of the first polymer substrate, and a thickness of the fourth buffer layer is different from a thickness of the first buffer layer.

16. The liquid crystal device according to claim 13, wherein a plurality of buffer layers are provided between the first polymer substrate and the second polymer substrate, and a single buffer layer is disposed on the second polymer substrate.

17. The liquid crystal device according to claim 13, wherein the fourth buffer layer is directly connected to a surface of the second polymer substrate.

18. The liquid crystal device according to claim 1, wherein the first buffer layer has a water absorption rate lower than that of the first polymer substrate and that of the second polymer substrate.

19. The liquid crystal device according to claim 1, wherein at least one of the first polymer substrate and the second polymer substrate comprises a porous transparent polyimide polymer material.

20. The liquid crystal device according to claim 1, wherein the first polymer substrate comprises a first polymer bottom substrate and a first polymer top substrate.

* * * * *